United States Patent [19]
Ehrlich

[11] Patent Number: 5,997,076
[45] Date of Patent: Dec. 7, 1999

[54] LOGISTICS AT COMPOSITE PANEL VERTICAL JOINTS

[75] Inventor: Rodney P. Ehrlich, Monticello, Ind.

[73] Assignee: Wabash National Corporation, Lafayette, Ind.

[21] Appl. No.: 09/122,817

[22] Filed: Jul. 27, 1998

[51] Int. Cl.$^6$ ................................................ B62D 25/02
[52] U.S. Cl. ......................... 296/181; 296/191; 296/183
[58] Field of Search .................................. 296/181, 191, 296/183; 410/130, 132, 133, 139, 89, 152

[56] References Cited

U.S. PATENT DOCUMENTS

| | | |
|---|---|---|
| 3,386,218 | 6/1968 | Scott . |
| 3,393,920 | 7/1968 | Ehrlich ..................................... 296/181 |
| 3,815,500 | 6/1974 | Glassmeyer ......................... 296/183 X |
| 4,045,927 | 9/1977 | Diaz . |
| 4,104,840 | 8/1978 | Heintz et al. . |
| 4,656,809 | 4/1987 | Wilson . |
| 4,703,948 | 11/1987 | Ehrlich . |
| 4,810,027 | 3/1989 | Ehrlich . |
| 4,940,279 | 7/1990 | Abott et al. ............................. 296/181 |
| 4,958,472 | 9/1990 | Ehrlich . |
| 5,066,066 | 11/1991 | Yurgevich et al. ..................... 296/181 |
| 5,507,405 | 4/1996 | Thomas et al. . |
| 5,860,693 | 1/1999 | Ehrlich ................................ 296/181 X |

FOREIGN PATENT DOCUMENTS

| | | |
|---|---|---|
| 772852 | 12/1967 | Canada . |
| 946984 | 1/1964 | United Kingdom . |
| 2107258 | 4/1983 | United Kingdom . |

*Primary Examiner*—Joseph D. Pape
*Attorney, Agent, or Firm*—Trexler, Bushnell, Giangiorgi & Blackstone, Ltd.

[57] ABSTRACT

A novel joint is used to join panels of a trailer wall. The joint is formed by joining to two composite panels joined together. Each panel is formed from inner and outer skins and a core therebetween. At least a portion of the ends of the panels are spaced apart from each other to define a gap therebetween. A member is attached to the inner skin of at least one of the panels and has a plurality of slots provided therethrough which are aligned with the gap for attachment of items to the wall. Structure is provided to join the panels together along the outer skins. In most embodiments, a portion of one panel's inner skin overlaps the member and has a plurality of slots therethrough which align with the slots provided through the member. In these, the member acts as a doubler to reinforce the slots provided through the overlapping portion. In one embodiment, the member is attached to the inner skins of the panels and acts as a logistics plate. The member may be seated against a stepped end portion of at least one of the panels or may have rolled edges which seat in indentations formed in the panel inner skins. The joining structure may be formed by a portion of one panel's outer skin overlapping the other panel's outer skin and being attached thereto. The overlapping portion may have a bulging section along the length thereof which aligns with the gap between the panels.

37 Claims, 4 Drawing Sheets

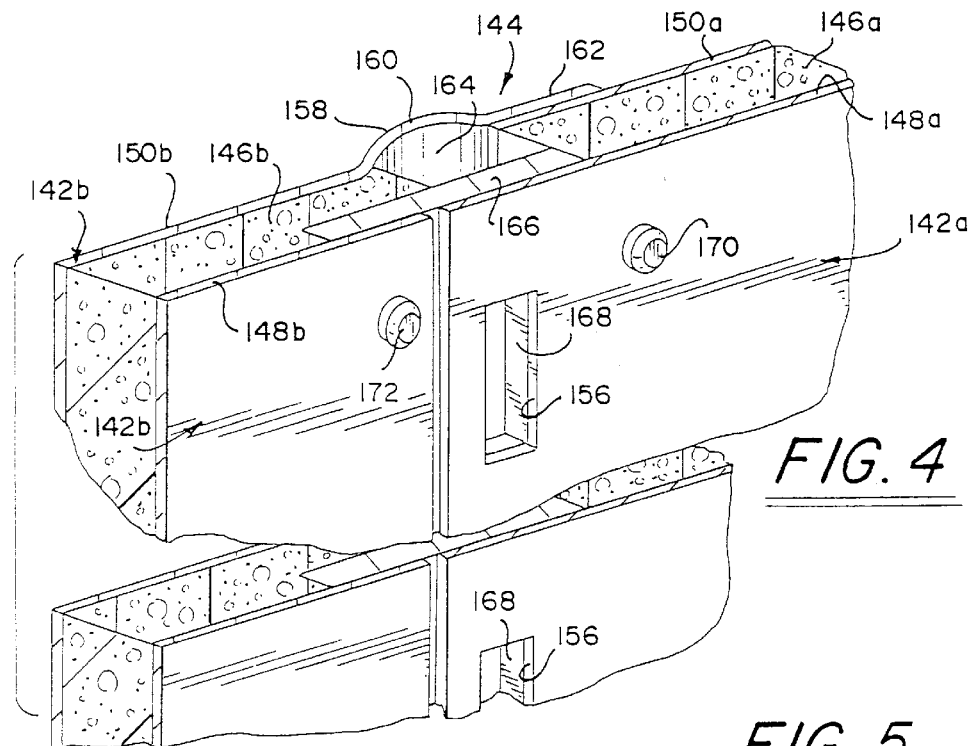
FIG. 4
FIG. 5
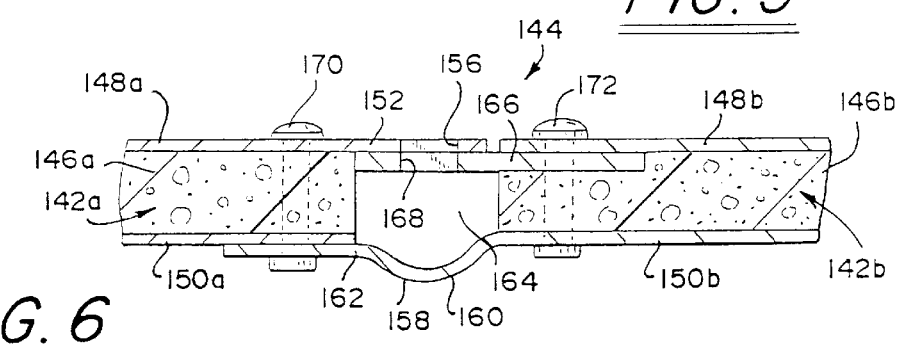
FIG. 6
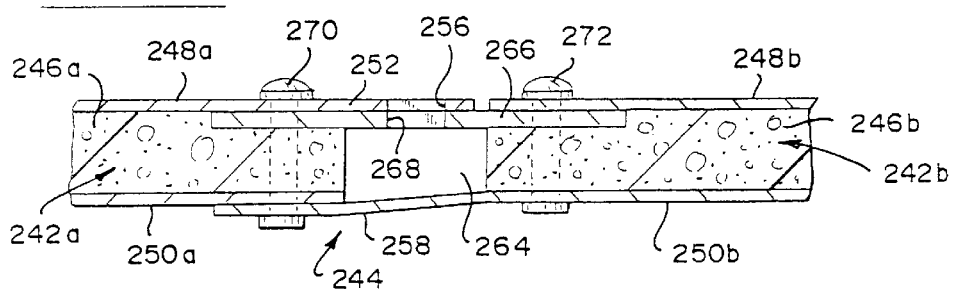
FIG. 7
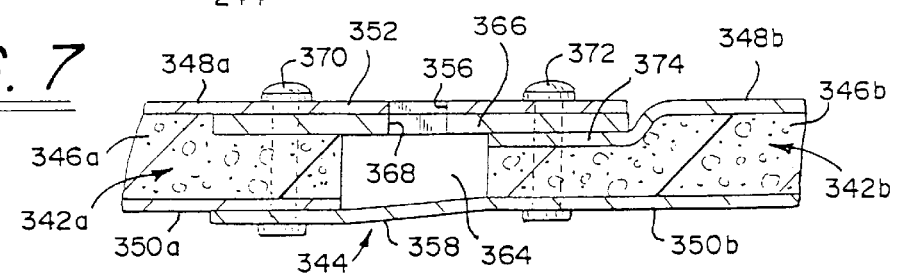

LOGISTICS AT COMPOSITE PANEL VERTICAL JOINTS

BACKGROUND OF THE INVENTION

This invention is generally directed to a novel joint for joining composite panels together to form a wall for a trailer body. More particularly, the invention relates to joined composite panels for trailer bodies, wherein each composite panel includes a plastic core member sandwiched between thin metal skins and joined together by novel joints.

Trailers of the general type disclosed herein include a variety of types of sidewalls. A typical well-known construction is a panel-type trailer which includes aluminum side posts. Generally, it is desirable to have a relatively thin trailer sidewall so that the total inside dimensions of the trailer body can be increased to carry the optimum amount of cargo. In addition, it is desirable to have a trailer sidewall which is lightweight.

OBJECTS AND SUMMARY OF THE INVENTION

A general object of the present invention is to provide a novel joint configuration for joining a pair of composite panels together in a trailer wall, wherein a plurality of such joined panels may be used to form the trailer wall.

An object of the present invention is to provide a novel wall for use in a trailer body, which wall is simple in design and economical to manufacture while at the same time providing maximum interior space in the trailer body.

Another object of the present invention is to provide a novel wall having a plurality of joined composite panels, wherein each composite panel includes a plastic core member sandwiched between thin metal skins.

These and other objects and features of the present invention will become more apparent from a reading of the following descriptions.

Briefly, and in accordance with the foregoing, the present invention discloses a novel joint for joining panels adapted for use in a wall of a trailer. The joint has at least two composite panels joined together. Each panel is formed from inner and outer thin metal skins and a plastic core sandwiched between the skins. At least a portion of the ends of the panels are spaced apart from each other a predetermined distance to define a gap therebetween.

Structure is provided to join the panels together along the outer skins. The joining structure may be formed by a portion of the outer skin of one of the panels overlapping the outer skin of the other of the panels and being attached thereto by suitable means, such as rivets. The overlapping portion may have a bulging section along the length thereof which aligns with the gap between the panels. The bulging section may extend along the entire height of the panels or may extend along substantially the entire height, such that flattened portions are provided at the top and bottom edges of the panels adjacent to the bulging section. This facilitates the attachment of top and bottom rails to the joined panels when the assembly is used as a trailer wall.

A member is attached to the inner skin of at least one of the panels. The member has a plurality of slots therethrough which are aligned with the gap for attachment of items to the wall.

In most embodiments, a portion of the inner skin of one of the panels overlaps the member. The overlapping portion has a plurality of slots therethrough which align with the slots provided through the member. In these embodiments, the member acts as a doubler to reinforce the slots provided through the overlapping portion.

In one embodiment, the member is attached to the inner skins of the panels and acts as a logistics plate.

In some embodiments, the member is seated against a stepped end portion of at least one of the panels. The member may have rolled edges which seat in indentations formed in the inner skins of the panels.

The member may be positioned between the inner skin and said core member of one or both of the panels. When the embodiments which use the stepped end portion, the member is preferably seated between the overlapping portion and the stepped end portion.

The member may be a separate member from the inner skins. Alternatively, the member may be formed by folding over the inner skin of one of the panels such that the member is integrally formed with the panel.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 4 is a perspective view of the pair of joined panels of FIG. 3 shown with the inside of the wall being predominantly shown;

FIG. 5 is a cross-sectional view of the pair of joined panels shown in FIGS. 3 and 4;

FIG. 6 is a cross-sectional view of a pair of joined panels used in forming a wall of the trailer shown in FIG. 2 which incorporates the features of a second embodiment of the invention;

FIG. 7 is a cross-sectional view of a pair of joined panels used in forming a wall of the trailer shown in FIG. 2 which incorporates the features of a third embodiment of the invention;

DETAILED DESCRIPTION OF THE PREFERRED EMBODIMENT

Figure 1:
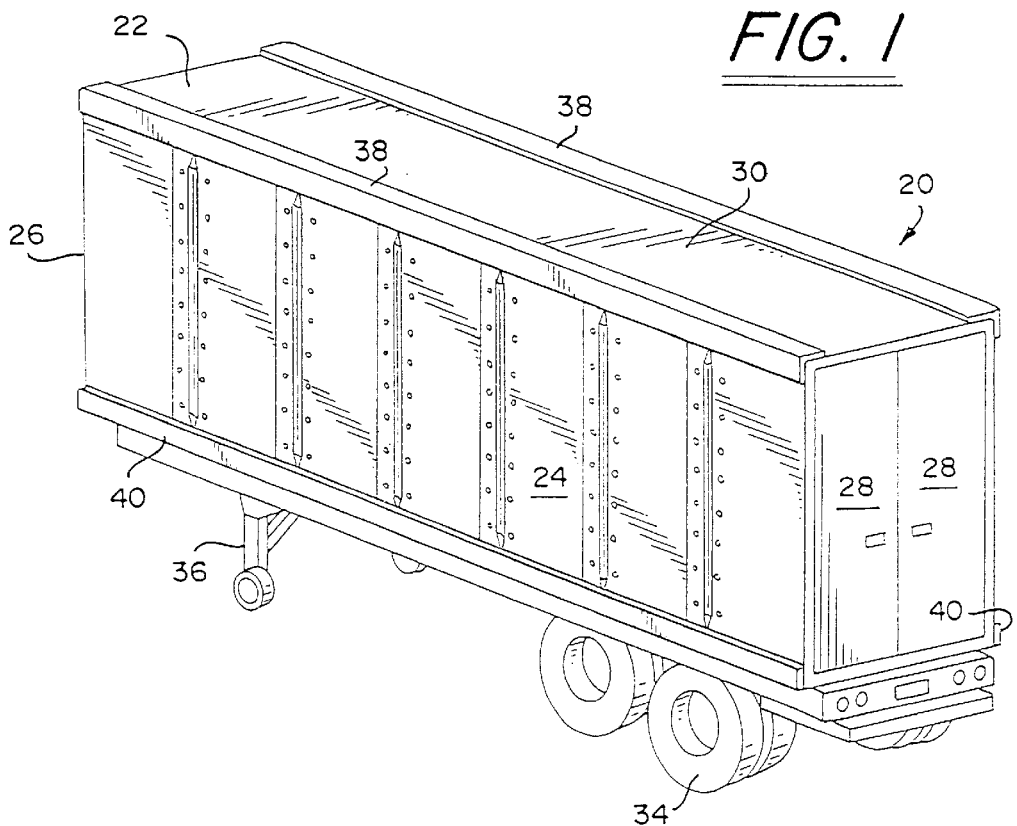
FIG. 1 is a perspective view of a trailer having a plurality of joined panels forming the walls of the trailer which incorporates the features of the invention.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 2:
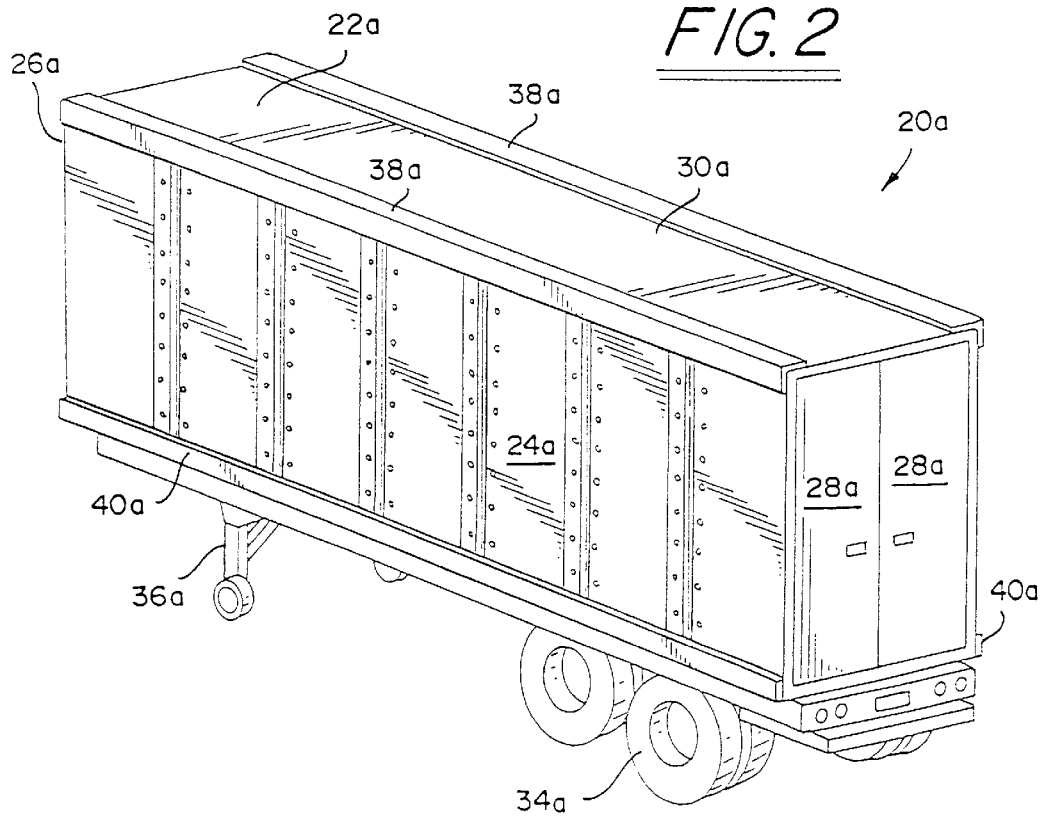
FIG. 2 is a perspective view of a trailer having a plurality of joined panels forming the walls of the trailer which incorporates the features of the invention.

Turning now to the drawings, a trailer 20, 20a constructed in accordance with the present invention is shown in FIGS. 1 and 2 can be connected to a tractor (not shown) by conventional means, such as a fifth wheel assembly. The trailer 20, 20a includes a body 22, 22a formed from a pair of rectangular sidewalls 24, 24a, a front wall 26, 26a, rear doors 28, 28a, a top panel or roof 30, 30a and a floor. The floor is supported by a conventional rear undercarriage assembly 34, 34a and has a landing gear 36, 36a secured thereunder. The top panel 30, 30a and an upper portion of the sidewalls 22, 22a are secured to a top rail 38, 38a, and the floor and lower portion of the sidewalls 22, 22a are secured to a bottom rail 40, 40a. Each of the top and bottom rails 38, 38a, 40, 40a are usually formed by an aluminum extrusion.

Each sidewall 22, 22a includes a plurality of vertical upstanding composite side panels joined together by a novel joint configuration formed in accordance with the present invention. Each composite side panel includes a core member sandwiched between an inner thin metal skin and an outer thin metal skin and bonded thereto by a suitable known adhesive or other like means. One advantage the composite panel used in the present invention is that it can be coined or stepped down easily by applying pressure to the area to be coined or stepped down, whereas in the prior art aluminum sidewalls, the aluminum sidewall could not be easily coined.

The inner skin and the outer skin are preferably approximately 0.026 inches thick. The skins are preferably made of aluminum; galvanized, full hardened steel, such as AISI Grade E full hard steel because of its cost effectiveness, or the like. Preferably, the outer skin is made of ASTM G90 galvanized steel and the inner skin is made of ASTM G60 galvanized steel. Aluminum may be used, but it may be too soft for some purposes and strength and punch resistance are sacrificed, however, aluminum is lightweight. Typically, each panel is four feet in width, but can be longer or shorter depending on the application. At least two panels are joined together by the novel joint configuration to form the sidewall 24, 24a of the trailer body 22, 22a.

Each core member is made of some type of compressible non-metal material, preferably thermal plastic, such as polypropylene or high density polyethylene. These materials are relatively inexpensive as compared to aluminum found in prior trailer wall constructions. In addition, because a composite panel is used, the weight of the trailer construction is reduced over trailers having aluminum sidewalls.

Figure 3:
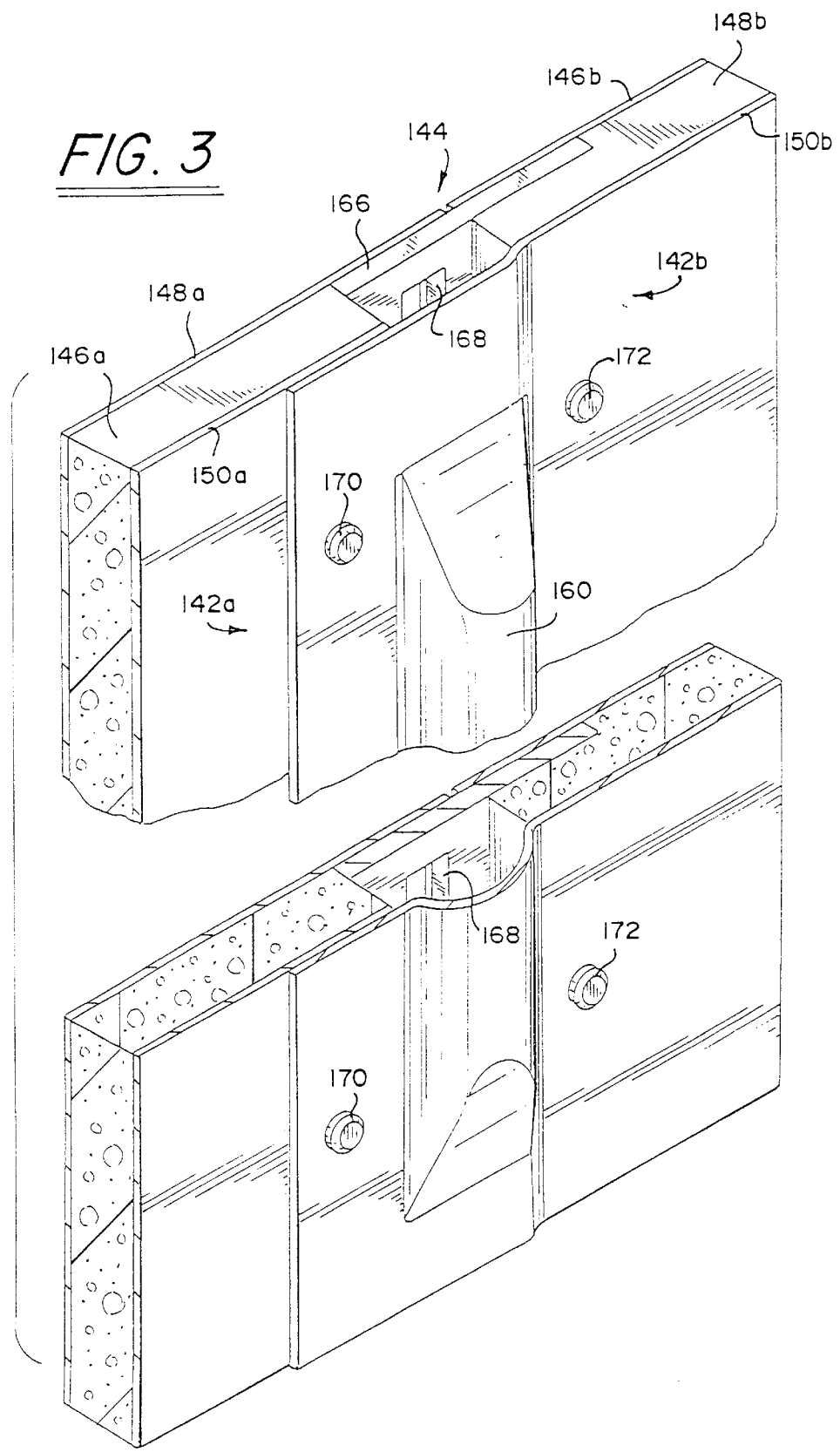
FIG. 3 is a perspective view of a pair of joined panels used in forming a first embodiment of the wall of the trailer shown in FIG. 1, such panels being shown with the exterior side of the wall being predominantly shown.
Figure 8:
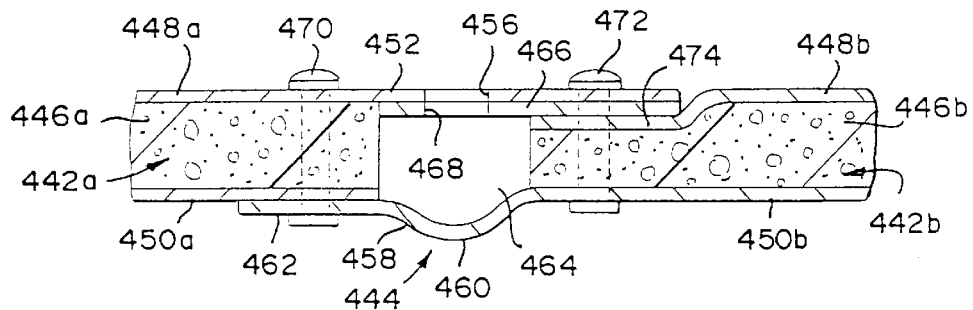
FIG. 8 is a cross-sectional view of a pair of joined panels used in forming a wall of the trailer shown in FIG. 1 which incorporates the features of a fourth embodiment of the invention.
Figure 9:
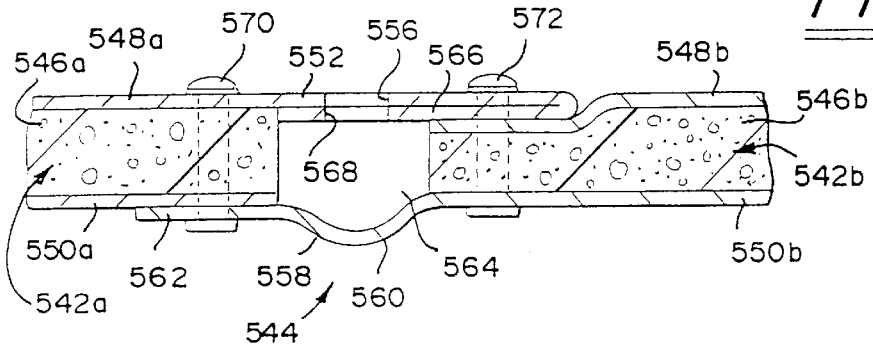
FIG. 9 is a cross-sectional view of a pair of joined panels used in forming a wall of the trailer shown in FIG. 1 which incorporates the features of a fifth embodiment of the invention.
Figure 10:
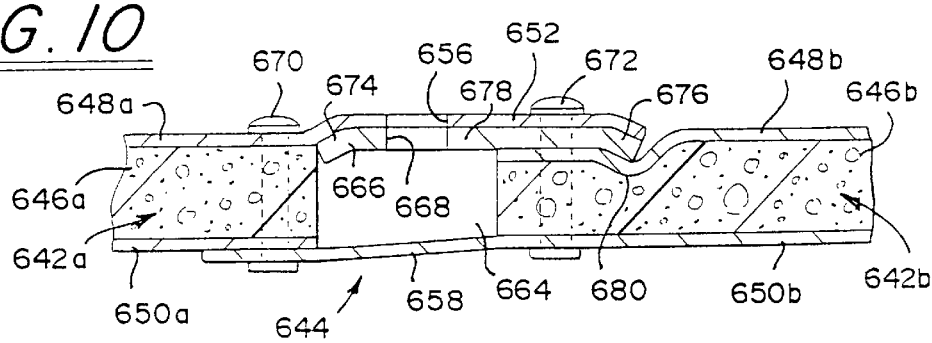
FIG. 10 is a cross-sectional view of a pair of joined panels used in forming a wall of the trailer shown in FIG. 2 which incorporates the features of a sixth embodiment of the invention.
Figure 11:
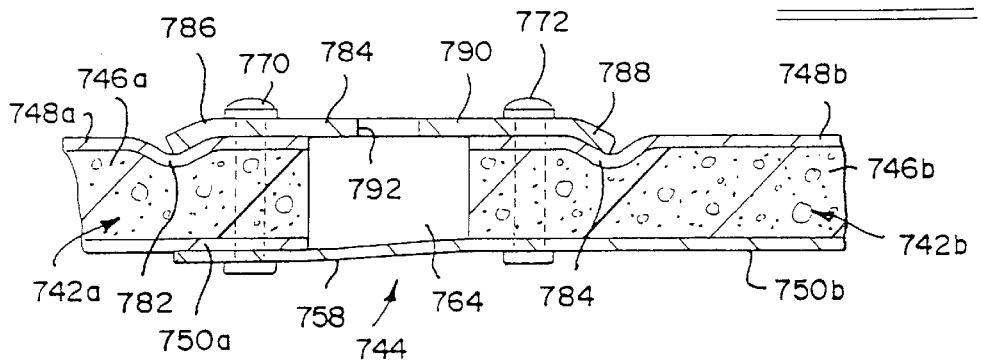
FIG. 11 is a cross-sectional view of a pair of joined panels used in forming a wall of the trailer shown in FIG. 2 which incorporates the features of a seventh embodiment of the invention.

Attention is now directed to the various embodiments of the novel joint configuration used in forming the trailer sidewalls 24, 24a as shown in FIGS. 3–12. A first embodiment of the novel joint configuration 144 is shown in FIGS. 3–5. A second embodiment of the novel joint configuration 244 is shown in FIG. 6; a third embodiment of the novel joint configuration 344 is shown in FIG. 7; a fourth embodiment of the novel joint configuration 444 is shown in FIG. 8; a fifth embodiment of the novel joint configuration 544 is shown in FIG. 9; a sixth embodiment of the novel joint configuration 644 is shown in FIG. 10; a seventh embodiment of the novel joint configuration 744 is shown in FIG. 11; and a eighth embodiment of the novel joint configuration 844 is shown in FIG. 12. Like elements are denoted with like reference numerals with the first embodiment being in the one hundreds, the second embodiment being in the two hundreds, the third embodiment being in the three hundreds, the fourth embodiment being in the four hundreds, the fifth embodiment being in the five hundreds, the sixth embodiment being in the six hundreds, the seventh embodiment being in the seven hundreds and the eighth embodiment being in the eight hundreds. As shown in the drawings, only a portion of two joined panels 142a, 142b; 242a, 242b; 342a, 342b; 442a, 442b; 542a, 542b; 642a, 642b; 742a, 742b; 842a, 842b are shown. It is to be understood that a plurality of joined panels may be used to form each wall 124, 224, 324, 424, 524, 624, 724, 824. In addition, the novel joint 144, 244, 344, 444, 544, 644 ,744, 844 is only shown between one end of the two panels 142a, 142b; 242a, 242b; 342a, 342b; 442a, 442b; 542a, 542b; 642a, 642b; 742a, 742b; 842a, 842b. It is to be understood that a like joint is provided between each adjacent end of each panel used to form the trailer walls.

Directing attention to FIGS. 3–5, the first embodiment of the novel joint configuration 144 is shown connecting the ends of first and second composite panels 142a, 142b.

Panel 142a has an outer skin 150a which terminates at the edge of the core member 146a. The inner skin 148a extends a predetermined distance beyond the end of the core member 146a to define an extending portion 152. The extending portion 152 of the inner skin 148a has a plurality of spaced logistics slots 156 therethrough along the height of the panel 142a.

Panel 142b has an inner skin 148b which terminates at the edge of the core member 146b. The outer skin 150b extends a predetermined distance beyond the end of the core member 146b to define an extending portion 158. The portion 160 of the extending portion 158 proximate to the end of the core member 146b is coined or rolled and the portion 162 from the coined or rolled portion 160 to the end of the outer skin 150b is flat.

When the first and second panels 142a, 142b are connected together, the ends of the core members 146a, 146b are spaced from each other to define an air gap 164. The flat portion 162 of the outer skin 150b of panel 142b abuts and overlaps the outer skin 150a of panel 142a and the coined or rolled portion 160 of the outer skin 150b is aligned with and spans the air gap 164 between the ends of the core members 146a, 146b. The slots 156 in the inner skin 148a align with the air gap 164. The shape of the extending portion 158 provides for additional space in the air gap 164.

A flat member or doubler 166 is also provided in the joint configuration 144. In this embodiment, a portion of the doubler 166 is positioned between the extending portion 152 of the inner skin 148a and the air gap 164 and the other portion of the doubler 166 is positioned between the inner skin 148b and the core member 146b such that the extending portion 152 overlaps a portion of the doubler 166. One end of the doubler 166 abuts against the end of core member 146a and the other end is positioned between the inner skin 148b and the core member 146b. The doubler 166 is bonded to the inside of the extending portion 152 by suitable means. The doubler 166 has a plurality of logistics slots 168 therethrough which align with the logistics slots 156 provided through the extending portion 152 and with the air gap 164.

To secure the joint configuration 144 together, suitable means are provided. As shown in the drawings, a plurality of spaced rivets 170 are provided through the flat portion 162, the outer skin 150 the core member 146a and the inner skin 148a. A plurality of spaced rivets 172 are also provided through the outer skin 150b, the core member 146b, the doubler 166 and the inner skin 148b.

Attention is now directed to the second embodiment of the novel joint configuration 244 shown in FIG. 6. The novel joint configuration 244 is shown connecting the ends of first and second composite panels 242a, 242b.

Panel 242a has an outer skin 250a which terminates at the edge of the core member 246a. The inner skin 248a extends a predetermined distance beyond the end of the core member 246a to define an extending portion 252. The extending portion 252 of the inner skin 248a has a plurality of spaced logistics slots 256 therethrough along the height of the panel 242a.

Panel 242b has an inner skin 248b which terminates at the edge of the core member 246b. The outer skin 250b extends a predetermined distance beyond the end of the core member 246b to define an extending portion 258. As shown in the drawings, the extending portion 258 is flat; that is to say, it is not shown in the drawings with a coined or rolled portion as is shown in the first embodiment.

When the first and second panels 242a, 242b are connected together, the ends of the core members 246a, 246b are spaced from each other to define an air gap 264. A portion of the extending portion 258 of the outer skin 250b of panel 242b abuts and overlaps the outer skin 250a of panel 242a and a portion of the outer skin 250b is aligned with and spans the air gap 264 between the ends of the core members 246a, 246b. The slots 256 in the inner skin 248a align with the air gap 264. The extending portion 258 is bent outwardly to overlap the outer skin 246a of the panel 242a.

A flat member or doubler 266 is also provided in the joint configuration 244. In this embodiment, an end portion of the doubler 266 and one end thereof is positioned between the inner skin 248a and the core member 246a; a middle portion of the doubler 266 is positioned between the extending portion 252 of the inner skin 248a and the air gap 264; and the other end portion of the doubler 266 and other end thereof is positioned between the inner skin 248b and the core member 246b such that the extending portion 252 overlaps the a portion of the doubler 266. The doubler 266 is bonded to the inside of the inner skins 248a, 248b and the extending portion 252 by suitable means. The doubler 266 has a plurality of logistics slots 268 provided through its middle portion which align with the logistics slots 256 provided through the extending portion 252 and with the air gap 264.

To secure the joint configuration 244 together, suitable means are provided. As shown in the drawings, a plurality of spaced rivets 270 are provided through the extending portion 258 which abuts against the outer skin 250a, the outer skin 250a, the core member 246a, the end portion of the doubler 266, and the inner skin 248a. A plurality of spaced rivets 272 are also provided through the outer skin 250b. the core member 246b, the other end portion of the doubler 266, and the inner skin 248b.

Attention is now directed to the third embodiment of the novel joint configuration 344 shown in FIG. 7. The novel joint configuration 344 is shown connecting the ends of first and second composite panels 342a, 342b.

Panel 342a has an outer skin 350a which terminates at the edge of the core member 346a. The inner skin 348a extends a predetermined distance beyond the end of the core member 346a to define an extending portion 252. The extending portion 352 of the inner skin 348a has a plurality of spaced logistics slots 356 therethrough along the height of the panel 342a.

Panel 342b has an inner skin 348b which terminates at the edge of the core member 346b. The inner skin 348b is coined or stepped to define a coined or stepped end portion 374. The outer skin 350b extends a predetermined distance beyond the end of the core member 346b to define an extending portion 358. As shown in the drawings, the extending portion 358 is flat; that is to say, it is not shown in the drawings with a coined or rolled portion.

When the first and second panels 342a, 342b are connected together, the ends of the core members 346a, 346b are spaced from each other to define an air gap 364. A portion of the extending portion 358 of the outer skin 350b of panel 342b abuts and overlaps the outer skin 350a of panel 342a and a portion of the outer skin 350b is aligned with and spans the air gap 364 between the ends of the core members 346a, 346b in an identical manner to that of the second embodiment. The slots 356 in the inner skin 348a align with the air gap 364. The extending portion 358 is bent outwardly to overlap the outer skin 346a of the panel 342a.

A flat member or doubler 366 is also provided in the joint configuration 344. In this embodiment, an end portion of the doubler 366 and one end thereof is positioned between the inner skin 348a and the core member 346a; a middle portion of the doubler 366 is positioned between the extending portion 352 of the inner skin 348a and the air gap 364; and the other end portion of the doubler 366 and other end thereof is positioned between the extending portion 352 of the inner skin 348a and the coined or stepped end portion 374 of the inner skin 348b such that the extending portion 352 overlaps a portion of the doubler 366. Thus, the extending portion 352 of the inner skin 348a in this embodiment is much longer than the extending portion 152, 252 in the first and second embodiment. The doubler 366 is bonded to the inside of the inner skin 348a and the extending portion 352 by suitable means. The doubler 366 has a plurality of logistics slots 368 provided through its middle portion which align with the logistics slots 356 provided through the extending portion 352 and with the air gap 364. The end of the extending portion 352 and the end of the doubler 366 terminate at the transition point of the coined or stepped end portion 374 and the remainder of the inner skin 348b. Because of the coined or stepped end portion 374, the inner skin 348a of the panel 342a is coplanar with the inner skin 348b of the panel 342b.

To secure the joint configuration 344 together, suitable means are provided. As shown in the drawings, a plurality of spaced rivets 370 are provided through the extending portion 358 which abuts against the outer skin 350a, the outer skin 350a, the core member 346a, the end portion of the doubler 366, and the inner skin 348a. A plurality of spaced rivets 372 are also provided through the outer skin 350b, the core member 346b, the other end portion of the doubler 366, and the extending portion 352 of the inner skin 348b, such that the rivets 372 pass through the coined or stepped end portion 374.

Attention is now directed to the fourth embodiment of the novel joint configuration 444 shown in FIG. 8. The novel joint configuration 444 is shown connecting the ends of first and second composite panels 442a, 442b.

Panel 442a has an outer skin 450a which terminates at the edge of the core member 446a. The inner skin 448a extends a predetermined distance beyond the end of the core member 446a to define an extending portion 452. The extending portion 452 of the inner skin 448a has a plurality of spaced logistics slots 456 therethrough along the height of the panel 442a.

Panel 442b has an inner skin 448b which terminates at the edge of the core member 446b. The inner skin 448b is coined or stepped to define a coined or stepped end portion 474. The outer skin 450b extends a predetermined distance beyond the end of the core member 446b to define an extending portion 458. The portion 460 of the extending portion 458 proximate to the end of the core member 446b is coined or rolled and the portion 462 from the coined or rolled portion 460 to the end of the outer skin 450b is flat.

When the first and second panels 442a, 442b are connected together, the ends of the core members 446a, 446b are spaced from each other to define an air gap 464. Portion 462 of the extending portion 458 abuts and overlaps the outer skin 450a and the coined or rolled portion 460 is aligned with and spans the air gap 464 between the ends of the core members 446a, 446b in an identical manner to that of the first embodiment. The slots 456 in the inner skin 448a align with the air gap 464.

A flat member or doubler 466 is positioned such that one end abuts against core member 446a and the other end thereof is positioned between the extending portion 452 of the inner skin 448a and the coined or stepped end portion 474 of the inner skin 448b such that the extending portion 452 overlaps the doubler 466. The doubler 466 is bonded to the inside of the extending portion 452 of the inner skin 448a by suitable means. The doubler 466 has a plurality of logistics slots 468 provided through its middle portion which align with the logistics slots 456 provided through the extending portion 452 and with the air gap 464. The end of the extending portion 452 and the end of the doubler 466 terminate at the transition point of the coined or stepped end portion 474 and the remainder of the inner skin 448b. Because of the coined or stepped end portion 474, the inner skin 448a of the panel 442a is coplanar with the inner skin 448b of the panel 442b to provide a generally smooth surface therebetween.

To secure the joint configuration 444 together, suitable means are provided. As shown in the drawings, a plurality of spaced rivets 470 are provided through the extending portion 458 which abuts against the outer skin 450a, the outer skin 450a, the core member 446a, and the inner skin 448a. A plurality of spaced rivets 472 are also provided through the outer skin 450b, the core member 446b, the end portion of the doubler 466, and the extending portion 452 of the inner skin 448b, such that the rivets 472 pass through the coined or stepped end portion 474.

Directing attention to the fifth embodiment of the novel joint configuration 544 shown in FIG. 9. This embodiment of the joint configuration 544 is identical to the embodiment of the joint configuration shown in FIG. 8, except that the doubler 566 is formed by folding or rolling the extending portion 552 under to form a double layer. Therefore, the doubler 552 is not a separate member as is shown in the other embodiments. Reference numerals in this embodiment shown in the drawings denote like structure in the other embodiments. The doubler 566 can be elongated such that it will have an end which is positioned between the core member 546b and the inner skin 548a and the rivets 570 will pass therethrough.

Attention is now directed to the sixth embodiment of the novel joint configuration 644 shown in FIG. 10. The novel joint configuration 644 is shown connecting the ends of first and second composite panels 642a, 642b.

Panel 642a has an outer skin 650a which terminates at the edge of the core member 646a. The inner skin 648a extends a predetermined distance beyond the end of the core member 646a to define an extending portion 652. The extending portion 652 of the inner skin 648a has a plurality of spaced logistics slots 656 therethrough along the height of the panel 642a and is shaped as described herein.

Panel 642b has an inner skin 648b which terminates at the edge of the core member 646b. The inner skin 648b is coined or stepped to define a coined or stepped end portion 674. In addition, the inner skin 648b has an indentation 680 proximate to the transition point of the coined or stepped end portion 674 and the remainder of the inner skin 648b, such indentation 680 being formed by coining the inner skin 648b. The outer skin 650b extends a predetermined distance beyond the end of the core member 646b to define a flat extending portion 658.

When the first and second panels 642a, 642b are connected together, the ends of the core members 646a, 646b are spaced from each other to define an air gap 664. A portion of the extending portion 658 of the outer skin 650b of panel 642b abuts and overlaps the outer skin 650a of panel 642a and a portion of the outer skin 650b is aligned with and spans the air gap 664 between the ends of the core members 646a, 646b in an identical manner to that of the second embodiment. The slots 656 in the inner skin 648a align with the air gap 664.

In this embodiment, the member or doubler 666 is not completely flat. The doubler 666 has rolled ends 674, 676 with a flat middle portion 678. The logistics slots 668 are provided through the flat middle portion 678.

The doubler 666 is positioned such that the end of rolled end 674 abuts against core member 646a and the other rolled end 676 is positioned between the extending portion 652 of the inner skin 648a and the coined or stepped end portion 674 of the inner skin 648b. The rolled end 676 is seated within the indentation 676. The extending portion 652 overlaps and is bent over to conform to the shape of the doubler 666. The doubler 666 is bonded to the inside of the extending portion 652 of the inner skin 648a by suitable means. The plurality of logistics slots 668 provided through its flat middle portion 678 align with the logistics slots 656 provided through the extending portion 652 and with the air gap 664. The shape of the doubler 666 provides for additional space in the air gap 664.

To secure the joint configuration 644 together, suitable means are provided. As shown in the drawings, a plurality of spaced rivets 670 are provided through the extending portion 658 which abuts against the outer skin 650a, the outer skin 642a, the core member 646a, and the inner skin 648a. A plurality of spaced rivets 672 are also provided through the outer skin 650b, the core member 646b, the end portion of the doubler 666, and the extending portion 652 of the inner skin 648b, such that the rivets 672 pass through the coined or stepped end portion 674. The doubler 666 can be elongated such that it will have an end which is positioned between the core member 646b and the inner skin 648a and the rivets 670 will pass therethrough.

Attention is now directed to the seventh and final embodiment of the novel joint configuration 744, shown in FIG. 11, which is used to join panels 742a, 742b together.

Panel 742a has inner and outer skins 746a, 750a which terminate at the edge of the core member 746a. Inner skin 746a has an indentation 782 at a predetermined distance from the end thereof. The indentation 782 is formed by coining the inner skin 748b.

Panel 742b has an inner skin 748b which terminates at the edge of the core member 746b. Inner skin 746b has an indentation 784 at a predetermined distance from the end thereof. The indentation 784 is formed by coining the inner skin 748b. The outer skin 750b extends a predetermined distance beyond the end of the core member 746b to define a flat extending portion 758.

When the first and second panels 742a, 742b are connected together, the ends of the core members 746a, 746b are spaced from each other to define an air gap 764. A portion of the extending portion 758 of the outer skin 750b of panel 742b abuts and lays against the outer skin 750a of panel 742a and a portion of the outer skin 750b is aligned with and spans the air gap 764 between the ends of the core members 746a, 746b in an identical manner to that of the second embodiment.

A member 784 is provided for connection to the inner skins 746a, 746b. The member has rolled ends 786, 788 with a flat middle portion 790. A plurality of logistics slots 792 are provided through the flat middle portion 790.

The member 784 is positioned such that rolled end 786 is seated within indentation 782 and rolled end 788 is seated within indentation 784. The flat middle portion 790 spans the air gap 764. The plurality of logistics slots 792 provided through the flat middle portion 790 align with the air gap 764.

To secure the joint configuration 744 together, suitable means are provided. As shown in the drawings, a plurality of spaced rivets 770 are provided through the extending portion 758 which abuts against the outer skin 750a, the outer skin 742a, the core member 746a, the inner skin 748a, and the member 784. A plurality of spaced rivets 772 are also provided through the outer skin 750b, the core member 746b, the inner skin 748b, and the member 784. The rolled ends 786, 788 are seated within the respective indentations 782, 784 to provide for a smooth transition between the member 784 and the inner skins 746a, 746b.

In the embodiments which have a coined or stepped portion, i.e., FIGS. 7–11, when the panel is coined or stepped, the core member is squeezed or compressed between the inner and outer skins and the core member may slightly extrude outwardly from the end of the panel. In addition, coining the end portion of the panels condenses the plastic core member sufficiently to support clamping force or pressure from the rivets without subsequent loosening.

In each of the embodiments shown in FIGS. 1–10, the member or doubler 166, 266, 366, 466, 566, 666 is a member which reinforces the logistics slots 156, 256, 356, 456, 556, 656 provided through the extending portion 152, 252, 352, 452, 552, 652 of the inner skin 148a, 248a, 348a, 448a, 548a, 648a. In the embodiments shown in FIGS. 3–8, 10 and 11, the doubler 166, 266, 366, 466, 666 is a separate member and is formed from a heavier and stronger material than the material that is used for the skins 148a, 150a, 148b, 150b, for example, to provide strength and rigidity to the joint. It is to be understood that the folding over of the inner skin to form the doubler 566 as shown in FIG. 9 can be used in any of the embodiments shown in FIGS. 1–8 and 10.

The attachment of the doubler to the panels can be done by various methods including, but not limited to, adhesive, adhesive tie layers, rivets, staples, slug upset and pierce and coin. The slug upset consists of punching through both layers of material, but not to the point of shearing out the slug, removing the punch and upsetting, or coining, the pushed through slug material to produce an interlock. The pierce and coin involves shearing through both materials on multiple sides, but not all the way around a slug and then coining it to clinch the two pieces together.

The logistics slots 156, 168; 256, 268; 356, 368; 456, 468; 556, 568; 656, 668 provide means for which equipment can be engaged, for example by a clip, to the inner side of the sidewall 24, 24a of the trailer 20, 20a. The coined or rolled portion 160, 460, 560 of the outer skin extending portion 158, 458, 558 which is in line with the logistics slots 156, 168; 556, 568; 656, 668 and/or the rolled member 666, 766 provides extra clearance for logistics attachment. In the embodiments shown in FIGS. 3–5, 8 and 9, because the bulge formed by the coined or rolled portion 160, 460, 560 is provided on the outside of the trailer 20, a substantially smooth inner surface is provided within the trailer 20.

It is to be understood that the coined or rolled portion along the outside of the trailer can be used with joint configurations 244, 344, even though it is not shown in the drawings. It is also to be understood that the extending portion in any embodiment can be flat, as described with respect to the illustrated second embodiment.

Further, it is to be understood that while the present invention is described with respect to the trailer side walls, the novel joint could be used to join together panels used to form the front wall, rear doors, or a rear wall if rear doors are not provided.

While preferred embodiments of the present invention are shown and described, it is envisioned that those skilled in the art may devise various modifications of the present invention without departing from the spirit and scope of the appended claims.

The invention claimed is:

1. A wall construction which is adapted for use in forming a wall in a trailer body comprising: first and second panels, each said panel having opposite ends and comprising an inner metal skin, an outer metal skin and a plastic core member between said inner skin and said outer skin, at least a portion of said ends being spaced apart from each other a predetermined distance to define a gap between said panels; a member attached to said inner skin of at least one of said panels, said member having a plurality of slots therethrough for attachment of items to said wall, said slots being aligned with said gap; and means for joining said panels together along said outer skins, a portion of said inner skin of said first panel overlapping said member, said overlapping portion having a plurality of slots therethrough which align with the slots provided through said member.

2. A wall construction as defined in claim 1, wherein said joining means is formed by a portion of said outer skin of one of said panels overlapping said outer skin of the other of said panels, said overlapping portion of said outer skin being attached to said outer skin of said other of said panels.

3. A wall construction as defined in claim 2, wherein said overlapping portion of said outer skin has a bulging section along the length thereof, said bulging section aligning with said gap.

4. A wall construction as defined in claim 3, wherein said panels have a predetermined height, said bulging section extending along substantially the entire height, and said overlapping skin portion of said outer skin having flattened portions at the top and bottom edges adjacent to said bulging section.

5. A wall construction as defined in claim 1, wherein a portion of said member is positioned between said inner skin and said core member of one of said panels.

6. A wall construction as defined in claim 1, wherein a portion of said member is positioned between each said inner skin and said core member of each said panel.

7. A wall construction as defined in claim 1, wherein an end portion of said inner skin of said second panel is stepped to define a stepped end portion; one of said overlapping portion of said first panel or a portion of said member being positioned against said stepped end portion of said second panel.

8. A wall construction as defined in claim 7, wherein said portion of said member is positioned between said stepped end portion and said overlapping portion of said first panel.

9. A wall construction as defined in claim 7, wherein a portion of said member is positioned between said inner skin and said core member of said first panel.

10. A wall construction as defined in claim 7, wherein said member is formed by folding over the inner skin of said first panel such that said member is integrally formed with said first panel.

11. A wall construction as defined in claim 1, wherein said member has opposite ends, at least one of said ends being rolled, and said inner skin of said second panel has an indentation therein, said rolled end of said member being seated within said indentation.

12. A wall construction as defined in claim 11, wherein both said ends of said member are rolled and said overlapping portion of said inner skin of said first panel conforms to the shape of said member.

13. A wall construction as defined in claim 11, wherein said member is positioned between said overlapping portion of said inner skin of said first panel and said inner skin of said second panel.

14. A wall construction as defined in claim 11, wherein at least one of said ends of said second panel is stepped to define a stepped end portion, said indentation is formed along the length of said stepped end portion.

15. A wall construction as defined in claim 14, wherein a portion of said member is positioned between said overlapping portion of said inner skin of said first panel and said stepped end portion.

16. A wall construction as defined in claim 15, wherein both said ends of said member are rolled and said overlapping portion of said inner skin of said first panel conforms to the shape of said member.

17. A wall construction as defined in claim 1, wherein said member is formed by folding over the inner skin of said first panel such that said member is integrally formed with said first panel.

18. A wall construction which is adapted for use in forming a wall in a trailer body comprising: first and second panels, each said panel having opposite ends and comprising an inner metal skin, an outer metal skin and a plastic core member between said inner skin and said outer skin, at least a portion of said ends being spaced apart from each other a predetermined distance to define a gap between said panels; a member attached to said inner skin of at least one of said panels, said member having a plurality of slots therethrough for attachment of items to said wall, said slots being aligned with said gap; and means for joining said panels together along said outer skins formed by a portion of said outer skin of one of said panels overlapping said outer skin of the other of said panels, said overlapping portion of said outer skin being attached to said outer skin of said other of said panels.

19. A wall construction as defined in claim 18, wherein said overlapping portion of said outer skin has a bulging section along the length thereof, said bulging section aligning with said gap.

20. A wall construction as defined in claim 19, wherein said panels have a predetermined height, said bulging section extending along substantially the entire height, and said overlapping skin portion of said outer skin having flattened portions at the top and bottom edges adjacent to said bulging section.

21. A wall construction as defined in claim 18, wherein said member has opposite ends, at least one of said ends being rolled, and at least one of said inner skins of said panels has an indentation therein, said rolled end of said member being seated within said indentation.

22. A wall construction as defined in claim 21, wherein both said ends of said member are rolled and both said inner skins of said panels have indentations therein, said rolled ends of said member being seated respectively within said indentations.

23. A wall construction as defined in claim 1, wherein said joining means has a bulging section along the length thereof, said bulging section aligning with said gap.

24. A wall construction as defined in claim 23, wherein said panels have a predetermined height, said bulging section extending along substantially the entire height, and said joining means further having flattened portions at the top and bottom edges adjacent to said bulging section.

25. A wall construction as defined in claim 18, wherein a portion of said inner skin of said first panel overlaps said member, said overlapping portion having a plurality of slots therethrough which align with the slots provided through said member, a portion of said member is positioned between said inner skin and said core member of one of said panels.

26. A wall construction as defined in claim 18, wherein a portion of said inner skin of said first panel overlaps said member, said overlapping portion having a plurality of slots therethrough which align with the slots provided through said member, a portion of said member is positioned between said each inner skin and said core member of each said panel.

27. A wall construction as defined in claim 18, wherein a portion of said inner skin of said first panel overlaps said member, said overlapping portion having a plurality of slots therethrough which align with the slots provided through said member, an end portion of said inner skin of said second panel is stepped to define a stepped end portion; one of said overlapping portion of said first panel or a portion of said member being positioned against said stepped end portion of said second panel.

28. A wall construction as defined in claim 27, wherein said portion of said member is positioned between said stepped end portion and said overlapping portion of said first panel.

29. A wall construction as defined in claim 27, wherein a portion of said member is positioned between said inner skin and said core member of said first panel.

30. A wall construction as defined in claim 27, wherein said member is formed by folding over the inner skin of said first panel such that said member is integrally formed with said first panel.

31. A wall construction as defined in claim 18, wherein a portion of said inner skin of said first panel overlaps said member, said overlapping portion having a plurality of slots therethrough which align with the slots provided through said member, said member has opposite ends, at least one of said ends being rolled, and said inner skin of said second panel has an indentation therein, said rolled end of said member being seated within said indentation.

32. A wall construction as defined in claim 31, wherein both said ends of said member are rolled and said overlapping portion of said inner skin of said first panel conforms to the shape of said member.

33. A wall construction as defined in claim 31, wherein said member is positioned between said overlapping portion of said inner skin of said first panel and said inner skin of said second panel.

34. A wall construction as defined in claim 31, wherein at least one of said ends of said second panel is stepped to define a stepped end portion, said indentation is formed along the length of said stepped end portion.

35. A wall construction as defined in claim 34, wherein a portion of said member is positioned between said overlapping portion of said inner skin of said first panel and said stepped end portion.

36. A wall construction as defined in claim 34, wherein both said ends of said member are rolled and said overlapping portion of said inner skin of said first panel conforms to the shape of said member.

37. A wall construction as defined in claim 18, wherein a portion of said inner skin of said first panel overlaps said member, said overlapping portion having a plurality of slots therethrough which align with the slots provided through said member, said member is formed by folding over the inner skin of said first panel such that said member is integrally formed with said first panel.

* * * * *

Disclaimer

5,997,076—Rodney P. Ehrlich, Monticello, IN. LOGISTICS AT COMPOSITE PANEL VERTICAL JOINTS. Patent dated December 7, 1999. Disclaimer filed August 24, 2005, by the assignee, Wabash National Corporation.

Hereby enters this disclaimer to claim 18 of said patent.

*(Official Gazette, November 15, 2005)*